Inventor
Roger N. Heald
Waldo J. Guild
Alfred P. Burns
George E. Garno

By
Geo. H. Kennedy Jr.
Attorney

March 18, 1930. R. N. HEALD ET AL 1,751,203
GRINDING MACHINE
Original Filed Jan. 24, 1925  8 Sheets-Sheet 5

Inventor
Roger N. Heald
Waldo J. Guild
Alfred P. Burns
George E. Garno
By
Geo. H. Kennedy Jr.
Attorney March 18, 1930.  R. N. HEALD ET AL  1,751,203
GRINDING MACHINE
Original Filed Jan. 24, 1925  8 Sheets-Sheet 7

Inventor
Roger N. Heald
Waldo J. Guild
Alfred P. Burns
George E. Garno

By Geo. H. Kennedy Jr.
Attorney

March 18, 1930.  R. N. HEALD ET AL  1,751,203
GRINDING MACHINE
Original Filed Jan. 24, 1925   8 Sheets-Sheet 8

Inventor
Roger N. Heald
Waldo J. Guild
Alfred P. Burns
George E. Garno

Patented Mar. 18, 1930

1,751,203

UNITED STATES PATENT OFFICE

ROGER N. HEALD, WALDO J. GUILD, ALFRED P. BURNS, AND GEORGE E. GARNO, OF WORCESTER, MASSACHUSETTS, ASSIGNORS TO THE HEALD MACHINE COMPANY, OF WORCESTER, MASSACHUSETTS, A CORPORATION OF MASSACHUSETTS

GRINDING MACHINE

Original application filed January 24, 1925, Serial No. 4,466. Divided and this application filed April 6, 1927. Serial No. 181,439. Renewed December 18, 1929.

The present invention relates to grinding machines, and is a division from our co-pending application, Serial No. 4,466, filed January 24, 1925. The subject matter of the said copending application relates to a grinding machine provided with automatic means to amplify the normal grinding reciprocation of the wheel and also automatic means to bring a dressing point into position to dress and true the said wheel. The present invention relates to the automatic dresser moving mechanism by and of itself. In many respects the machine of the present invention discloses mechanism similar to and having the same general capabilities as that shown in the copending application of Kempton and Gallimore, S. No. 6,689, filed February 4, 1925.

The machine shown and described in the said copending application and in this application is adapted for the rapid production of articles, such as sleeves, gears, bushings, ball races and the like, whose internal surfaces must be ground to close limits. As described in the said copending application, both the automatic dressing of the wheel and the final cessation of grinding are controlled and inaugurated by a caliper which makes contact, during the grinding operation, with the hole in the workpiece. Although said caliper means will be described in detail herein, so far as the invention claimed herein is concerned, any equivalent might be substituted therefor.

The above will more fully appear from the following description, taken in connection with the accompanying drawings, in which—

Like reference characters refer to like parts in the different figures.

Referring to the drawings, particularly Figs. 1 to 5 inclusive, the machine provides the usual reciprocatory table or carriage 1, which is ordinarily provided in any internal grinding machine. In such a machine, either the grinding wheel or the work to be ground may be carried on the table 1, the reciprocations of the latter being utilized in either case to produce a relative traversing movement between the grinding wheel and the work. As here shown, the table 1 supports and carries a wheel head 2 of the usual construction, while the work which is to be operated upon is held in a work head 3, the latter being carried by a bridge 4 which spans the slideways provided by the machine frame for the back and forth movement of the table 1.

Figure 5:
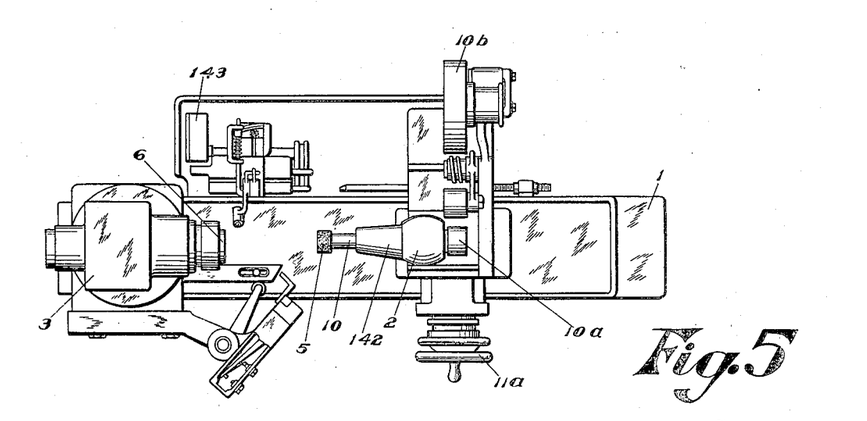

Said back and forth movement of the table 1, to cause the rotating grinding wheel 5 to make the required interior traverse of the rotating workpiece 6, may be imparted in any well known manner, as for instance, by the use of the fluid pressure controlling and reversing mechanism which forms the subject matter of United States Letters Patent No. 1,582,468, to Heald and Guild, granted April 27, 1926. Such mechanism, or its equivalent, forms no part of the present invention and a detailed description thereof is therefore unnecessary; it is sufficient to note, for the purpose of the present application, that the driving means employed for the reciprocation of table 1, be it hydraulic drive, or gear drive, or any other type, procures the reversal of said table at each end of the latter's normal working stroke by the use of spaced adjustable dogs 7 and 8, carried by the table and adapted to alternately engage and move an interposed member 9, whose position controls the direction of table travel.

Figure 3:
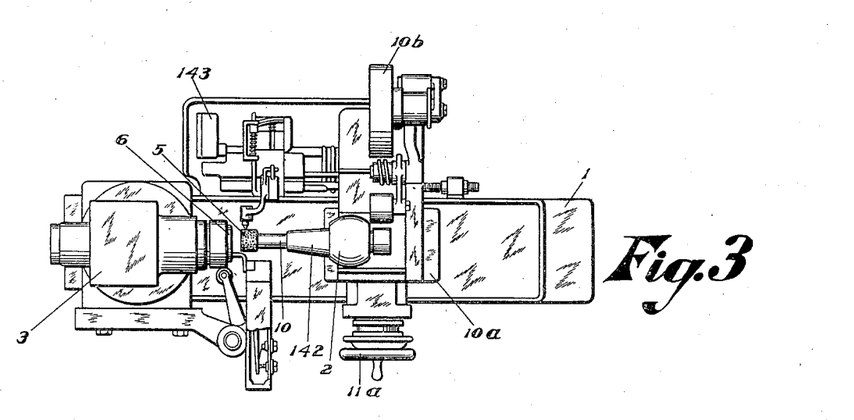

In the machine herein illustrated, the grinding wheel 5 is rotated at high speed in any suitable manner, for instance by a belt drive, Figs. 3 and 5, for the wheel spindle 10, the said wheel spindle having a pulley $10^a$ which is connected by a belt, not shown, to a larger pulley $10^b$ that is driven in any suitable manner. The workpiece 6 is also rotated, but at a slower speed, this rotation being imparted in any suitable manner, as by a belt drive, not shown, from a countershaft. The machine also embodies the usual instrumentalities for both manual and automatic cross feed between work and wheel, here shown as embodied in a screw shaft 11 for feeding the wheel head 2 transversely of the table 1. Said screw shaft 11 may be operated, if desired, by the usual hand wheel $11^a$. The automatic operation of said screw shaft 11 is effected in the usual manner, at each reciprocation of the table 1, by a fixed dog or stop 12 which is engaged by a roller 13 on the end of a pivoted arm 14; the movements of said arm are tranmitted through suitable pawl and ratchet mechanism, not shown, to the screw shaft 11, thereby to obtain the automatic cross feed of the grinding wheel 5 at each reciprocation of the table.

Figure 11:
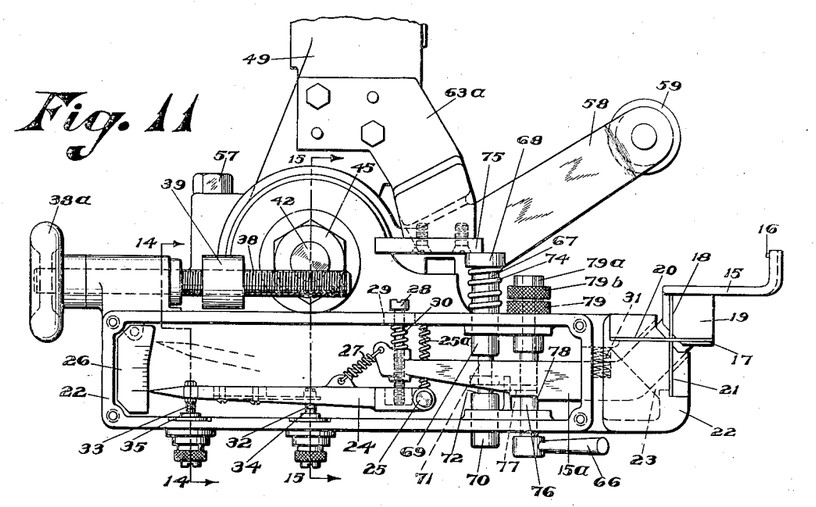
Fig. 11 is a fragmentary plan view, on an enlarged scale, of the work gauging device and its associated parts.
Figure 12:
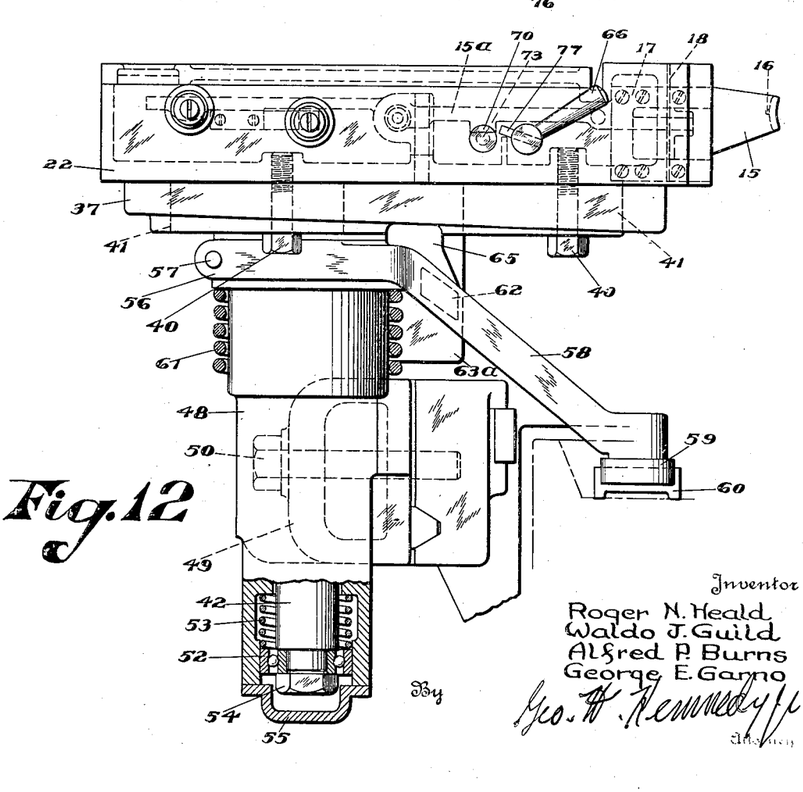
Fig. 12 is a side view of the parts shown in Fig. 11.

The foregoing mechanism is old and well known in the art and of itself forms no part of the present invention. Said present invention involves the automatic moving of a dressing point, preferably a diamond, in response to initiation by the caliper mechanism shown and described in the said copending application, or some suitable equivalent. Referring now to Figs. 11 and 12, said mechanism provides a member 15, having at one end a work calipering point adapted, during the operation of grinding a workpiece, to bear against the internal surface which is being ground, and to maintain its contact with said surface as the hole in the workpiece is gradually enlarged by the grinding action of the wheel. The member 15 is to all intents and purposes a lever, said member, for the movement required of it to maintain the point 16 in constant contact with the interior of the gradually enlarging hole in the workpiece, being supported by a pair of flexible U-shaped flat springs 17 and 18, which springs cross each other, as shown in Fig. 11, and are attached to two adjacent sides of a rectangular block portion 19 of member 15. At their other ends the crossed springs 17 and 18 are attached to two inner surfaces 20 and 21 of a box 22, these surfaces 20 and 21 being at right angles to each other, and the box 22 providing an opening 23 of sufficient size to permit the inward extension $15^a$, of member 15, to move freely about the pivotal axis which is afforded by the intersection of the planes of the U-shaped springs 17 and 18. This pivotal movement is accomplished by the flexing of these two springs, and takes place in the entire absence of lost motion, since there is no bearing or pivot pin. Consequently, any movement of the extension $15^a$ of member 15 within the box 22, is invariably in exact accordance with the movement of calipering point 16 in maintaining contact with the surface of the gradually enlarging hole in the workpiece.

Such motion of the member 15 is adapted to be transmitted to an indicator lever 24, pivoted at 25 within the box 22, with its free end adapted to move across the graduations of a suitable scale 26. Lost motion may be eliminated at bearing 25 by a spring $25^a$. The connection between extension $15^a$ and indicator lever 24 is made by a spring 27, which draws the parts together and maintains the lever 24 in contact with the end of a screw 28, said screw being adjustably threaded in extension $15^a$ and passing at its head end through a suitably enlarged slot or hole 29 in box 22, so as to permit adjustment from the exterior of said box. By turning the screw 28, the indicator lever 24 can be made to assume any desired position relative to the member 15, and said screw 28 is maintained in any given setting, and displacement thereof prevented by any suitable friction device, such as a spring 30. With the arrangement above described, a very slight movement of the calipering point 16 is multiplied many times in being transmitted to the indicator lever 24, as will be readily understood.

In the operation of the mechanism, the calipering point 16 maintains contact with the work, the movement of member 15 for this purpose being obtained by the pressure of a spring 31, and such movement, greatly multiplied, being transmitted through the above described connections to the indicator lever 24. The multiplied movement of the latter is made use of, at predetermined points, in the grinding of each workpiece, to set in operation successively, first, the wheel dressing instrumentalities, and second, the instrumentalities for bringing about cessation of the grinding, when the workpiece reaches a predetermined and desired size. To this end, the lever 24 carries two electrical contacts, namely a contact 32 for closing an electrical circuit that controls the wheel dressing operation, and a second contact 33 for subsequently closing an electrical circuit that controls the operations involved in cessation of grinding. In the paths of these two contacts 32 and 33, the box 22 provides suitable stationary terminal contacts 34 and 35, respectively. In the movement of lever 24, the points 32 and 34 come first into contact, and subsequently the points 33 and 35 come into contact; in order to permit this succession of contacts, the point 32 which engages first, is carried by the free end of a flat spring 36 attached to lever 24, so that, by the yielding of this spring, the subsequent movement of said lever, to bring the point 33 into contact with point 35, can take place.

Figure 1:
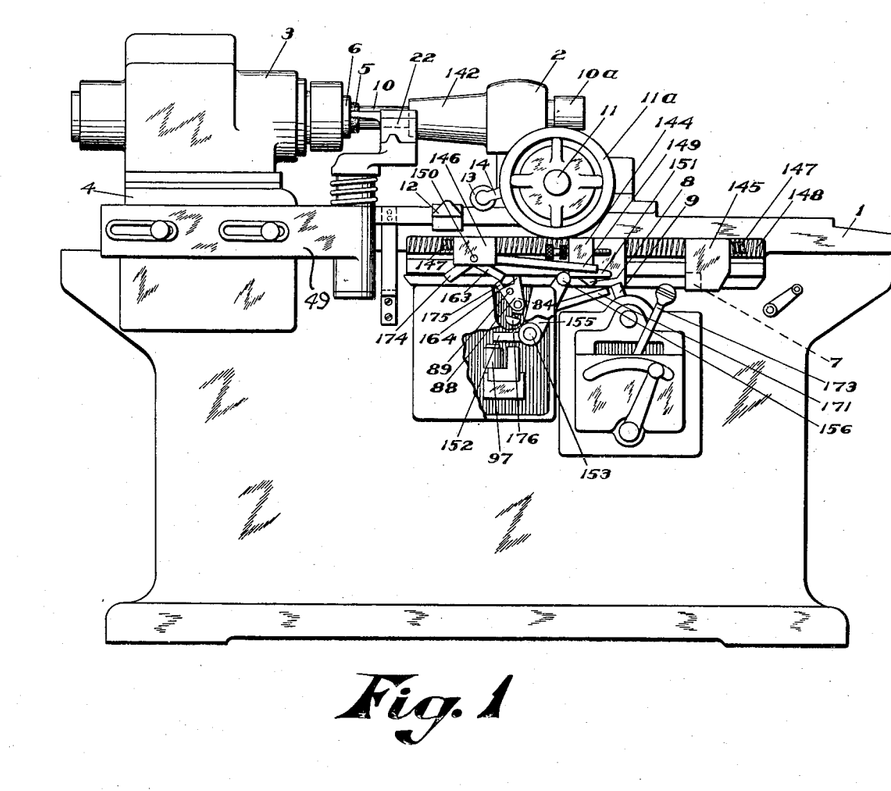
Fig. 1 is a front elevation of a grinding machine embodying the invention.
Figure 2:
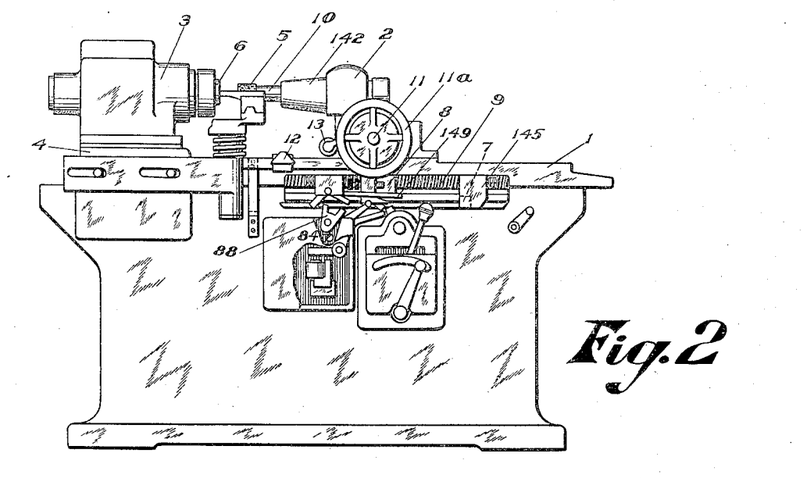
Figs. 2 and 3 are, respectively, a front elevation and a plan view, showing the wheel dressing operation.
Figures 8, 14, 15:
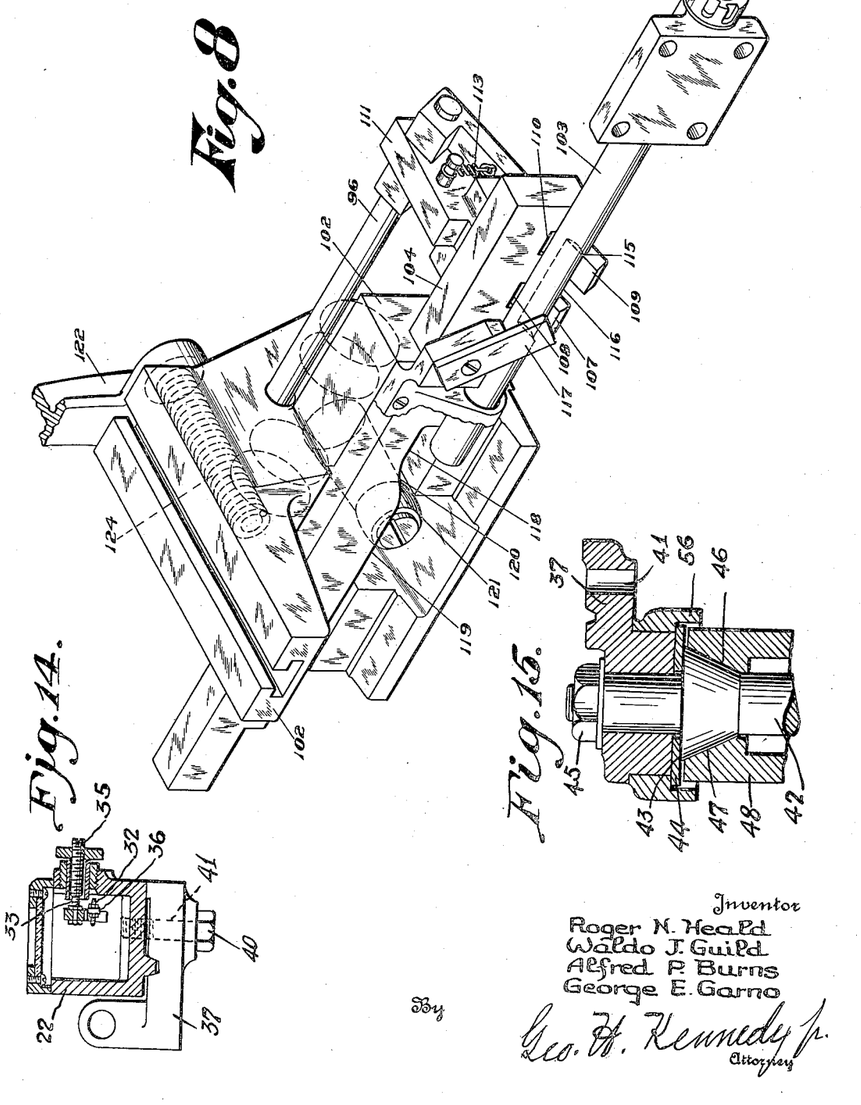
Fig. 8 is an enlarged isometric view of certain of the mechanisms shown in Figs. 6 and 7.
Fig. 14 is a sectional view on the line 14—14 of Fig. 11.
Fig. 15 is a sectional view on the line 15—15 of Fig. 11.
Figures 9, 13:
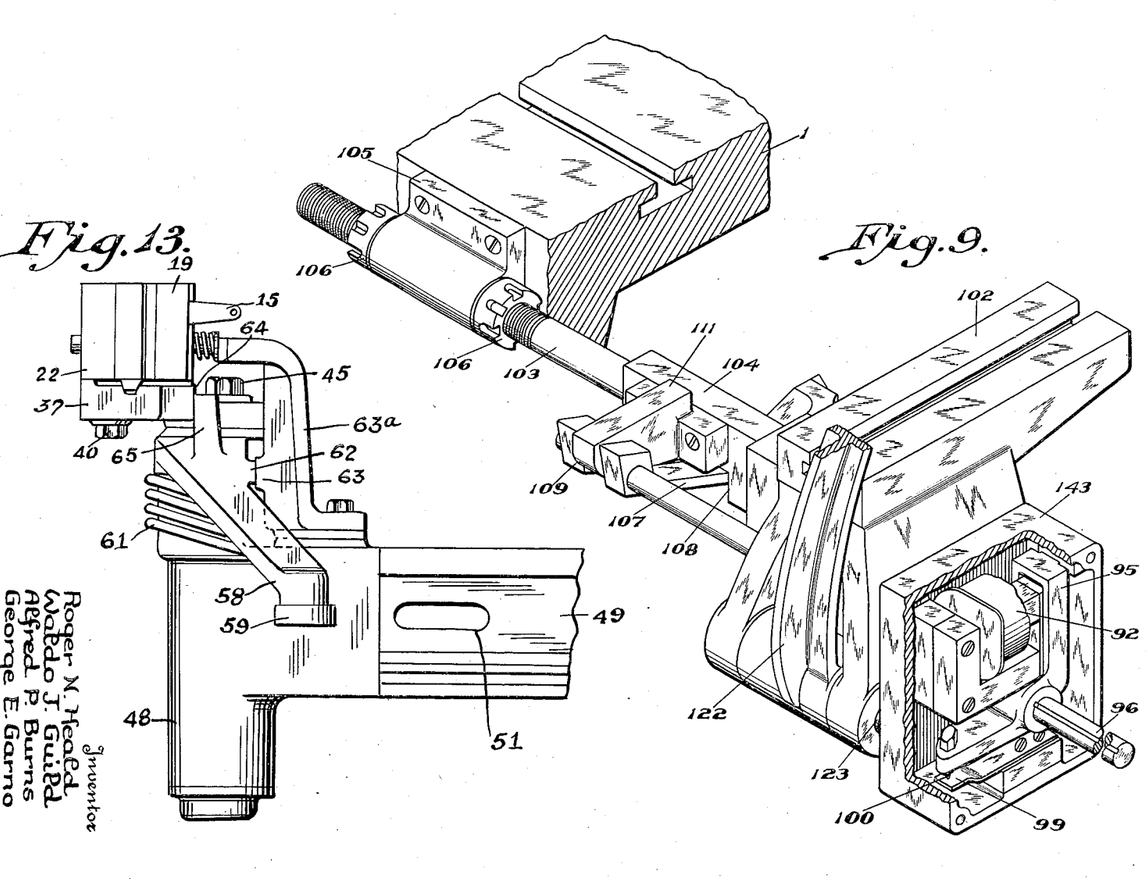
Fig. 9 is an enlarged isometric view from the rear of the machine of certain of the mechanisms shown in Figs. 6 and 7.
Fig. 13 is a detached rear view of the mechanism shown in Figs. 11 and 12.

The box 22 which carries the member 15 and indicator lever 24 as above described, is adjustable longitudinally on a supporting bracket 37, such adjustment being effected by a screw 38, turned by a hand wheel 38ª, said screw passing through a threaded lug 39 of bracket 37; after the box 22 has been adjusted as above described, it is firmly fastened in position by tightening the bolts 40, 40, which are threaded into the bottom of the box and pass through elongated slots 41, 41 of bracket 37, see Figs. 12, 14 and 15. Said bracket 37, which carries box 22, is rigidly attached to the upper end of a spindle 42, the construction being preferably as shown in Fig. 15, where the bracket 37 seats on a shoulder 43 of said spindle, or on an interposed washer 44, and is held firmly in position by a nut 45. Below the shoulder 43, the spindle 42 has a frusto conical portion 46, the latter being received in a similarly shaped bearing recess 47 provided by an elongated spindle bearing sleeve 48, preferably formed integrally with a casting or bracket 49. The latter, as shown in Figs. 1 and 13, is secured to the machine base by bolts 50, which pass through slots 51 of said casting or bracket, to permit longitudinal adjustment of the same. At its lower end the sleeve 48 provides a ball bearing 52 for the lower end of spindle 42, the outer race of said ball bearing being pressed downwardly by a spring 53 and the inner race being attached to the spindle 42 by a nut 54. See Fig. 12. A cap 55 prevents the entrance of dirt and abrasive to the interior of said sleeve.

The above described construction provides an extremely effective mounting for the box 22, to permit it to swing into inoperative position, as shown in Fig. 5, so as to withdraw the calipering point 16 from the completed workpiece, prior to the latter's removal from the machine. This swinging movement, on account of the extended bearing surfaces 46 and 47, takes place in the absence of play or lost motion and is effected in the following manner:—A split collar 56 surrounds that portion of the bracket 37 which is secured to the spindle 42, said collar being drawn into tight engagement with said bracket by a bolt 57. Extending from said collar is an arm 58 carrying a collar 59 which, in the normal work engaging position of the calipering point 16, lies in the path of, but spaced at some distance from, a cam bar 60 attached to the table 1. In this normal work engaging position, a strong coil spring 61, surrounding the sleeve 48 and attached thereto, exerts its force against arm 58 to rotate the latter counterclockwise. Said arm is firmly attached to the bracket 37 by collar 56 and bolt 57, and thus the force of spring 61, exerted on said arm, maintains the calipering and indicating mechanism as a unit in the position shown in Figs. 11, 12 and 13, where a lug 62 on arm 58 brings up against a fixed stop 63 formed on a bracket 63ª, which is attached to the casting 49. At the end of each grinding operation, when the table 1, as hereinafter described, is automatically given an extended movement to the right, as shown in Fig. 5, the cam bar 60, carried by said table, strikes roller 59 and rocks the arm 58 in a clockwise direction, against the force of spring 61, thereby swinging the entire calipering and indicating mechanism, as a unit, from the position shown in Fig. 3 into the inoperative position shown in Fig. 5, thus allowing the finished workpiece to be withdrawn and a new workpiece to be inserted in the chuck of the work head 3.

Should the operator, for any reason, desire to shift this mechanism manually into the inoperative position shown in Fig. 5, it is only necessary to loosen up on the bolt 57, thereby freeing the bracket 37 from the arm 58 and spring 61 and allowing said bracket with the attached box 22 to be swung freely out of the way. In restoring the parts to position for a resumption of the above described automatic operation, the operator swings the box and bracket until a surface 64 on the bracket engages with a lug 65 on arm 58; thereupon, the bolt 57 is again tightened to unite said arm and bracket.

In connection with the above described swinging movement of the calipering and indicating mechanism, the work calipering point 16 is automatically disposed in a position which prevents it from forcibly engaging the workpiece in the act of entering the same, and which makes it incumbent upon the operator to release the member 15, carrying said point, at the commencement of each grinding operation, by movement of a hand lever 66, as will now be described.

A rod 67 having a head 68 provides bearing portions 69 and 70 for sliding movement in bearing holes provided by opposite sides of the box 22. Between the bearing portions 69 and 70, the rod has a reduced neck 71, forming a shoulder 72 for cooperation with a downward projection 73, Fig. 12, of the extension 15ª. A spring 74 encircling the rod 67 and thrusting outwardly against the head 68 thereof, draws the shoulder 72 against projection 73, and, in the inoperative position of the calipering and indicating mechanism shown in Fig. 5, this action of spring 74, being stronger than the action of spring 31, rocks the member 15 in a clockwise direction, thus to hold the calipering point 16 in an inoperative position. However, when the mechanism is swung from the position of Fig. 5 to the position of Fig. 3, the head 68 of rod 67, strikes a hardened steel stop plate 75 which is secured to the stationary stop member 63 and this action forces the rod 67 inwardly of the box 22 and relieves the member 15 of the influence of spring 74.

This action, of itself however, does not release the calipering point 16 for engagement with the surface of the workpiece. An additional safeguard is provided by a shaft 76 which is pivotally mounted transversely of box 22 in suitable bearings provided by the opposite sides of said box, and which shaft has secured thereto the hand lever 66, hereinbefore referred to. The disposition of said hand lever is such that the weight thereof tends to turn the shaft 76 in a clockwise direction, viewed from the front of the box 22. A pin 77 extending from shaft 76 cooperates with an edgewise shoulder 78 of extension 15ª in the following manner:—

When the rod 67, under the influence of spring 74, thrusts outwardly, and thereby rocks the member 15 in a clockwise direction, the pin 77 moves up in front of shoulder 78, due to the clockwise rotation of shaft 76 which is brought about by the overhang of hand lever 66. Thus said pin 77 serves to lock the member 15 in a position where the calipering point 16 will be inoperative. When subsequently the head of rod 67 engages the stop plate 75 as the calipering point moves into the work, and relieves the member 15 from the influence of spring 74, said member 15 still remains locked by pin 77 in inoperative position, and is not released from said position until the operator rocks the hand lever 66 upwardly; thereupon, under the influence of spring 31, the calipering point 16 will move into contact with the internal surface of the workpiece and the operative connection between extension 15ª and the indicator lever 24 will be established. With the next swinging movement of the parts into the inoperative position shown in Fig. 5, the spring 74 moves the member 15 in a clockwise direction and the unbalanced weight of handle 66 automatically locks said member in said position. The shaft 76 is adjustable transversely of the box 22 in order to accommodate the position of the locking pin 77 to various settings of member 15 for different sizes of work; this is accomplished by an adjusting nut 79 on bearing sleeve 79ª of said shaft, said nut 79 being held in any desired setting of check nut 79ᵇ.

Figure 10:
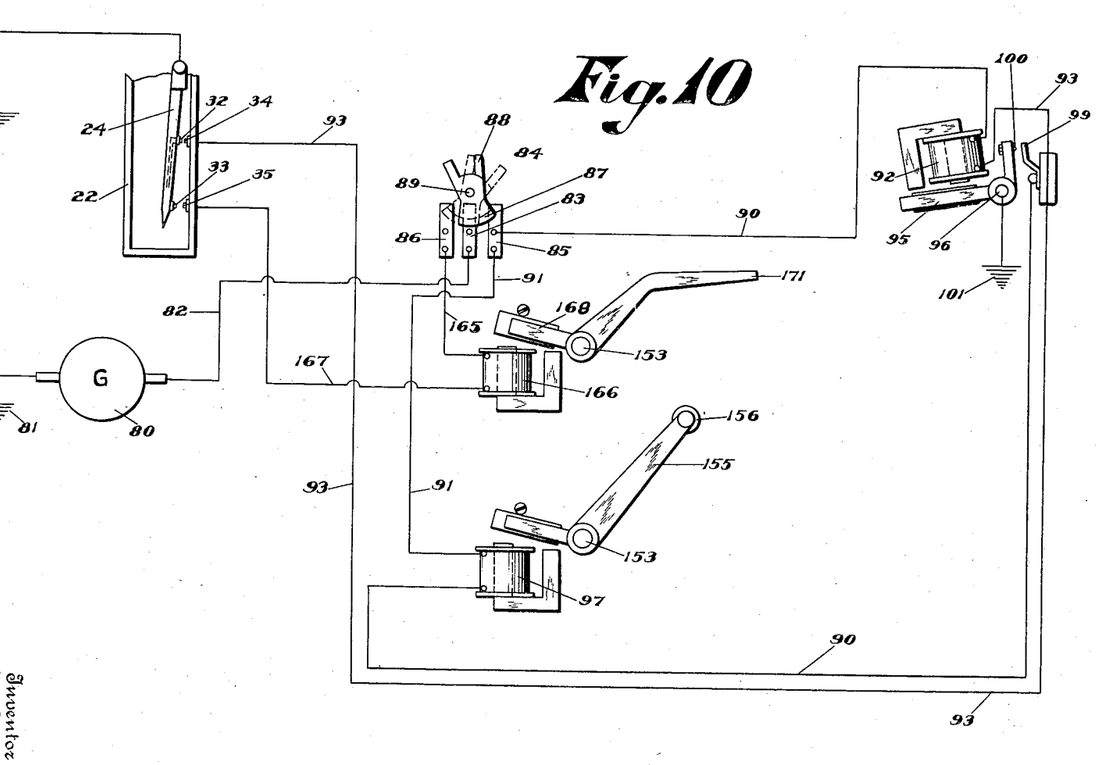
Fig. 10 is a wiring diagram.

In the use of the mechanism as described for the quantity production of identical workpieces all ground to the exact same internal size, a sample piece or pattern is first made and accurately gauged by hand, with the use of the ordinary sizing plugs or gauges. With this sample piece at the exact required size, and still rotating in the machine, after withdrawal of the grinding wheel from engagement therewith, the box 22 carrying the calipering and indicating mechanism is swung into operative position, and the point 16 caused to make contact with the finished ground surface of the sample. Then with this contact maintained, the position of the box is adjusted so that the end of the lever 24 registers with the zero marking on scale 26, and so that the point 33 on lever 24 will just make contact with the point 35, the latter being adjustable, in and out, for this purpose. Under these conditions, the point 32, which is carried by the spring 36, on lever 24, will also be in contact with the point 34; that is to say, the proportions of the parts are such that this last mentioned contact will have been made first, and will always be made first in the swinging of lever 24,—the spring 36 yielding sufficiently to allow the subsequent contact of points 33 and 35 to be made. These settings of the calipering and indicating mechanism and of the electrical contact points will be maintained throughout the subsequent run of the machine for the production of work-pieces exactly like the sample or pattern. When the points 32 and 34 make contact, an electrical circuit is formed which, by the mechanism now to be described, causes the table 1 to have an amplified stroke to the right, in order to withdraw the grinding wheel 5 from the work, and, simultaneously, to cause a wheel dressing member or diamond to move into the amplified path of said grinding wheel, thereby to true the periphery of the latter as it passes by the point of said diamond. As shown in the wiring diagram of Fig. 10, electrical current may be supplied by a direct current generator 80, driven continuously, by any suitable means, not shown, from the same source of power that is used for the rotation of the grinding wheel or of the work head spindle. One terminal of this generator 80 is grounded as shown at 81, and the other is connected by a supply lead 82 to the central bar or plate 83 of a two-way switch,—the latter being designated as a whole by the numeral 84 and being disposed as shown in Fig. 1, on the front of the machine. Said switch 84 provides additional contact plates or bars 85 and 86, arranged on opposite sides of the central bar 83, and adapted to be alternately connected electrically to said central bar 83 by a connector 87 which is mounted on an oscillatory member 88. The latter is pivoted at 89, and in its full line position as shown in Fig. 10, disposes the connector 87 in contact with and across the two plates 83 and 85; in its other or dotted line position, the movable member 88 of switch 84 disposes the connector 87 in contact with and across the two plates 83 and 86.

The normal position of the movable switch member 88 is that shown in the full lines, and under these conditions, the supply lead 82 from the generator 80 is connected to two leads 90 and 91 taken off of the plate or bar 85 of the switch 84. One of these leads, 90, runs to the coil of an electromagnet 92, disposed on the rear side of the machine and shown in perspective in Fig. 9. The return lead 93 from the coil of electromagnet 92 is connected to the stationary contact point 34 of box 22. When the point 32, which is grounded as shown at 94, makes contact with the point 34, the electrical circuit containing the coil of electromagnet 92 is closed and said electromagnet is energized; this attracts and causes movement of an armature member 95 associated with said electromagnet, which member, splined to a spindle 96, to be hereinafter referred to, normally, in the absence of current flow through the coil of electromagnet 92, occupies, by gravity, the position shown in Fig. 10.

The other lead, 91, from switch bar 85 passes to the coil of an electromagnet 97, disposed on the front of the machine, as shown in Fig. 1, and the return lead 98 from the coil of electromagnet 97 passes to an insulated spring contact 99, adjacent to the electromagnet 92. When the latter, as above described, is energized by the contact of points 32 and 34, the rocking movement of armature member 95 carries a contact point 100 into engagement with the insulated contact 99, and since said contact point 100 is grounded, as shown at 101, this grounds and completes the electrical circuit through the coil of electromagnet 97 and energizes said electromagnet. Thus the energization of the two electromagnets 92 and 97, the former for moving the dressing device and the latter for amplifying the stroke of the table, as hereinafter more fully described, is brought about by the movement of contact point 32 on indicator lever 24, into engagement with the contact point 34 of box 22,—and as will be apparent, the energization of magnet 97 is dependent upon the energization of magnet 92; in other words, the stroke of table 1 will not be amplified unless and until the mechanism for moving the dressing device into position is able to operate, which is signified by the rocking of spindle 96.

Said spindle 96 is suitably journalled in a box 143 which contains magnet 92, said box being secured to a dresser bracket 102 on the rear of the machine, and the partial rotation of said spindle 96, obtained, as above described, by the energization of electromagnet 92, is employed for the purpose of establishing a connection between two normally unconnected rods or bars, one of which, 103, is carried by the table 1, and the other of which, 104, is slidably mounted in the bracket or standard 102. The rod 103 moves with the reciprocatory table 1, being secured to said table by passage through a bracket 105 on the rear side of the table, and being held adjustably in place by means of nuts 106, 106, engaging with the threaded end portion of said rod. The slidable bar 104 is normally stationary, but when connected, as hereinafter described, to the reciprocating rod 103, its movement procures the shifting of a wheel dressing device in the path of the grinding wheel 5, as will now be shown.

Referring to Figs. 6, 7, 8 and 9, the spindle 96 has pinned thereto a finger 107, which in the normal inactive position of said spindle, passes through a slot 108 of bar 104 and has its free end lying just below the rod 103. Another finger 109 is loosely mounted on spindle 96, and it passes through a slot 110 of bar 104, with its free end disposed similarly to the free end of finger 107, but projecting slightly farther, as shown in Fig. 8. Between the two fingers 107 and 109 a block 111, secured to the bar 104, provides a journal bearing for the spindle 96, the latter in effect being supported and carried by said bar 104, and being moved longitudinally with said bar when the latter is itself moved,—this longitudinal movement of spindle 96 being permitted by the spline connection which it makes, as shown in Fig. 9, with the armature member 95. This longitudinal movement of spindle 96 has no effect on armature 95, the latter being held by any suitable means, not shown, in the box 143. The block 111 has secured thereto a casing 112, Figs. 6 and 7, which incloses the above described mechanism, and said block 111 also has secured thereto a spring 113, the latter acting on the loose finger 109 to draw it upwardly.

For cooperation with the two fingers 107 and 109, the rod 103 provides shoulders 114 and 115, respectively, these being formed by slabbing off said rod, as shown at 116, at an intermediate portion thereof, for a length slightly greater than the distance between the outside edges of said fingers. Under normal conditions, when the spindle 96 is in its inactive position, there is no engagement between the shoulder 114 and the outside edge of finger 107, and consequently the right hand movement of rod 103, in unison with table 1, has no effect on bar 104. Similarly, under normal conditions when the table 1 is reciprocating through its usual working path, the finger 109 is held in its downward position by a stationary cam member 117, so that it will not be engaged by either shoulder 114 or 115 in the movement of rod 103.

Figure 6:
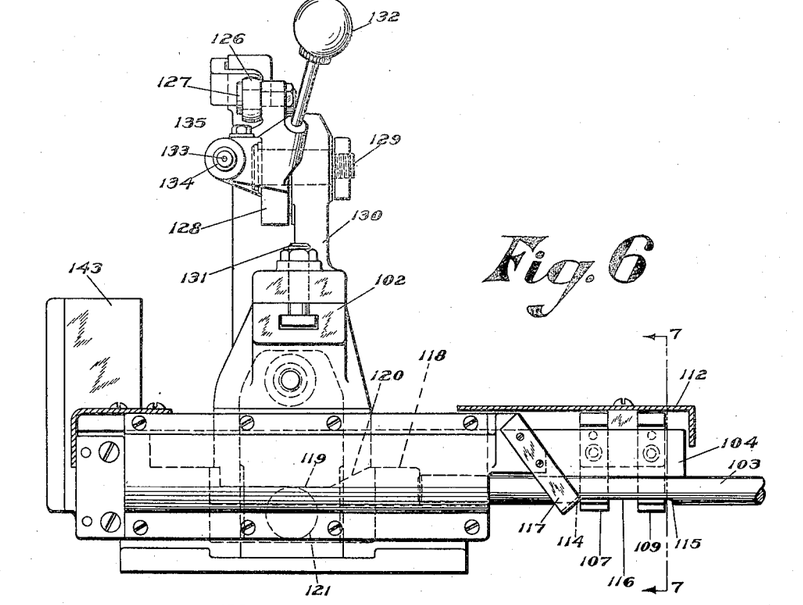
Fig. 6 is an enlarged elevational view from the front of the machine of the dresser operating mechanism.

However, when the spindle 96 is rocked, as heretofore described, by the contact of point 32 with point 34, the finger 107 moves up into the path of shoulder 114, and thus the right hand movement of rod 103 is transmitted through said finger to bar 104 to carry it into the position shown in Fig. 6. This movement carries the finger 109 away from member 117, allowing the spring 113 to draw said finger into the recess 116. Shortly after this right hand movement of bar 104 is initiated, the current through magnet 92 is shut off as hereinafter described, but the pressure of shoulder 114 against finger 107 holds said finger up, and it only drops back by gravity to inactive position when this pressure is relieved on the reversal of the travel of table 1. On such reversal, the bar 104 moves to the left with rod 103, this movement being effected by the pressure of shoulder 115 against the outside edge of finger 109. When the bar 104 reaches its normal position of rest (to the left of that shown in Figs. 6 and 8), the finger 109 is forced out of recess 116 by engagement with member 117, thus disconnecting bar 104 from the rod 103, which latter continues on to the left, as the table 1 resumes its normal working reciprocation, as hereinafter described. The member 117 does not engage the finger 107, but only the finger 109, this being due to the greater length of the last named finger. The above described movement of bar 104 obtains, successively, the movement of a dressing device into and then out of the path of the grinding wheel 5, in the following manner:—

Said bar 104, as shown in Figs. 6 and 8, provides on its under side two cam surfaces in different planes, namely a depressed surface 118 and a projecting surface 119, the two merging together by means of the inclined surface 120 and being operative on a roller 121 which is carried by the short arm of a bell crank lever 122, pivoted at 123 on the bracket or standard 102. The normal position occupied by the bar 104 is to the left of that shown in Figs. 6 and 8 and in this normal position, the depressed surface 118 is disposed directly above roller 121, the latter under these conditions rising into contact with said surface 118 under the influence of a strong spring 124, Fig. 7, carried by bracket 102 and thrusting outwardly against the long arm of bell crank lever 122 to move the latter to the right, as shown by the broken lines in Fig. 7. This dotted line position of lever 122 is the normal position which it occupies during the grinding operation and before the points 32 and 34 make contact to render the fingers 107 and 109 operative; when said fingers are rendered operative, the bar 104, moving to the right with rod 103, brings the cam portion 119 against the roller 121 and depresses the same, thereby causing the bell crank 122 to assume the full line position shown in Fig. 7. Thereafter on the return stroke of bar 104 as above described, the bell crank 122 resumes its normal dotted line position.

The upper end of the long arm of bell crank 122 is apertured for the passage of a link rod 125, whose other end has a slotted enlargement 126 which hooks over a stud 127 provided by a member 128. Said member 128 is mounted to swing on a trunnion 129, the latter being carried by a standard 130 which rises from the bracket 102 and which is adjustably attached to the latter by means of bolts 131, 131. A handle 132, secured to the swinging member 128, permits the operator to swing said member, after disconnecting link 125 from stud 127, to move a suitable wheel dressing point 133, preferably a diamond point, from the dotted to the full line position of Fig. 7, and vice versa,—the full line position being the operative position, where the diamond point is disposed in the path of the grinding wheel 5. Said diamond point 133 is preferably carried by a screw 134 which is adjustable in and out of the member 128, being held in any desired position of adjustment by a set screw 135.

Figure 7:
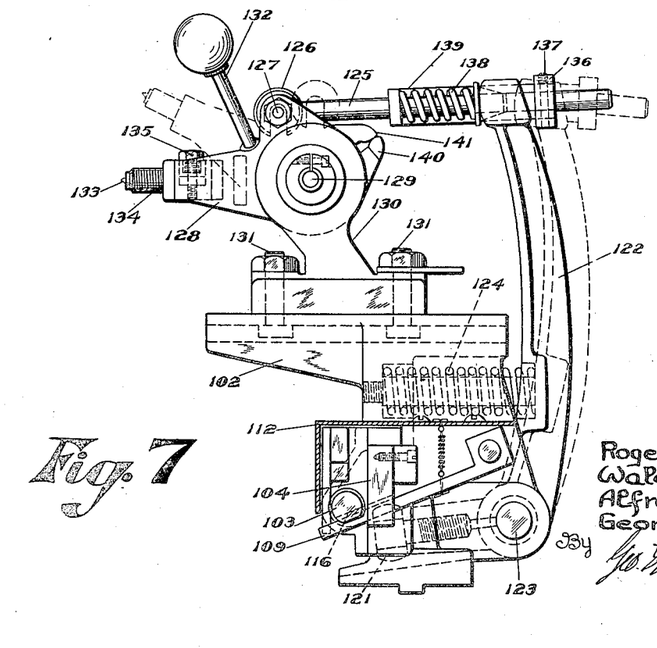
Fig. 7 is a view, partly in section and partly in elevation, of the mechanism shown in Fig. 6, the section being taken on the line 7—7 of Fig. 6.

The automatic movement of said diamond point through the above described operation of bell crank lever 122 and link rod 125 takes place in the following manner:—A collar 136 is adjustably secured by set screw 137 to the right hand end of link rod 125, this collar being engaged by the bell crank 122 in the latter's movement to the dotted line position of Fig. 7, thereby to swing the member 128 upwardly, so as to carry the diamond point 133 into its inoperative position. On the opposite or left hand movement of bell crank 122, which occurs as above described only when the points 32 and 34 make contact, the thrust of said bell crank 122 on link rod 125 is taken by a spring 138, which surrounds said link rod and which bears against the end of a yoke 139 extending forwardly from collar 136. This movement swings the dresser point 133 from the normal dotted line inoperative position to the full line operative position, which latter position is determined by the engagement of a lug 140 on swinging member 128 with a fixed stop 141 on standard 130. In no case can the dresser point be moved below or beyond the full line position shown, and any additional movement of bell crank 122 in this direction is absorbed by the spring 138.

As hereinafter described, simultaneously with this automatic disposal of the dresser point 133 in operative position by the right hand movement of bar 104, an amplified right hand movement of table 1 is initiated, which movement passes the wheel 5 across the dresser point 133 from left to right; then, upon reversal of the table, the wheel is passed again across the dresser point, this time from right to left, and during said left hand travel of the table, the bar 104, in moving to its normal position of rest, brings about the return of dresser point 133 to inoperative position, as shown by the broken lines in Fig. 7. Said dresser point 133 remains in such inoperative position, until the next succeeding workpiece inserted in the machine has been ground to a size which permits the points 32 and 34 to again make contact.

This maintenance of point 133 out of dressing position is especially significant, in view of the fact, as hereinafter described, that, at the conclusion of the grinding operation on each workpiece, the table 1 is again automatically run out to the right, to effect high speed withdrawal of the grinding wheel 5 from the working zone. On each such withdrawal movement, the grinding wheel 5 passes through the dressing position, but the dressing of said wheel on these occasions is avoided by retaining the dresser point 133 in inoperative position. Manifestly, from the standpoint of accuracy in the finished product, the very best time for dressing the grinding wheel and giving it a fresh cutting surface is just before said wheel takes the final and finishing cuts on the workpiece to bring it to the desired finished size. This interruption of the grinding operation, for the purpose of dressing the wheel, relieves the sidewise pressure of the wheel against the work-piece which has been built up in the grinding operation by successive advances of the cross-feed screw 11, and which pressure tends sometimes to spring the spindle 10 and to cause uneven wheel wear. When the grinding wheel, following its dressing, reenters the workpiece, the cross-feed imparted to it for taking the final and finishing cuts to bring the work to size is not sufficient to build up any excessive or objectionable pressure, and hence these final and finishing cuts are taken under ideal grinding conditions.

The wheel dressing operation above described, aside from its automatic inauguration, is thus far superior to any dressing of the wheel in the intervals between successive work-pieces; said last named dressing is of little value, because its effect is lost before the final and finishing cuts on the workpiece can be taken. In the present machine, where the grinding operation on each workpiece is interrupted, to provide for the dressing of the wheel just before the final and finishing cuts are taken, any further dressing, in the intervals between successive workpieces, would not only be useless, but would be harmful and wasteful. Harmful, because any contact between the dresser point 133 and the wheel 5, with the latter withdrawing from the work at high speed, would tend to cut a groove in the working surface of the wheel, and wasteful, because at such time, the wheel 5, in bringing the work to size, has been fed inwardly so far by the screw 11 that contact with the dresser point 133 would decrease its diameter excessively.

In addition to the above explained reasons for normally maintaining the dressing point 133 out of dressing position, is the further reason that said point, if left in said position, would be in the way of the bearing sleeve 142 (Figs. 1 to 5 inclusive) of the grinding wheel spindle 10, during the working reciprocations of table 1. Said spindle 10 obviously cannot have any excessive overhang beyond said bearing sleeve, because this would produce vibration that would destroy the accuracy of the grinding operation. Therefore, throughout the working strokes of table 1, the spindle bearing 142 must reciprocate in the dressing position or zone, and the descent of the dressing point into operative position is only permitted when the points 32 and 34 make contact, because, as a result of such contact, the right hand stroke of table 1 is automatically amplified, to carry the spindle bearing 142 away from the position or zone in question just as the dresser point 133 moves into it; this amplification of stroke, by the energization of electromagnet 97, takes place in the following manner:—

As shown in Fig. 1, the left hand table dog 8, which limits the right hand movement of table 1, is carried by a block 144 which, instead of being secured directly to the table 1, as is the case with the block 145 of dog 7, is mounted so as to be capable of sliding freely longitudinally of said table. Under normal conditions, when the table 1 is making its usual working reciprocations, to traverse the grinding wheel 5 back and forth within the workpiece, the block 144 of dog 8 is held in definite spaced relation to a block 146, which latter, the same as the block 145 of right hand dog 7, is a stationary block, adapted to maintain its predetermined setting or adjustment, longitudinally of the table 1, as given it by any suitable adjusting and holding degrees, such for instance as the hand screw nuts 147, 147 applied to both blocks 145 and 146 and engaging with a screw rack 148 on table 1.

A latch lever 149 pivoted at 150 on the block 146 constitutes the means to hold the block 144 in spaced relation to the block 146, the right hand bent-over end of said lever 149 being normally in engagement with a shoulder 151 provided by the block 144. The electromagnet 97 is located on the front of the machine as shown in Fig. 1, and when energized draws downwardly an armature 152, thus rocking upwardly a lever arm 155 carrying a roller 156, these parts being pivoted on a stud or shaft 153. The roller 156 is just below the latch lever 149 and when said lever arm 155 and roller 156 are raised in consequence of the energization of the magnet 97, the latch lever 149 is lifted, thus freeing it from the shoulder 151. This allows an amplified movement of the table 1, for the reason that the block 144 is not now rigidly attached to said table but is slidable thereon, and therefore the dog 8 will not immediately shift the reversing member 9, the resistance of said reversing member being greater than the friction of the slidable block 144 on the guideways by which it is carried on the table 1. Ultimately, however, the block 144 is engaged by the rigidly attached block 146 and thereupon the dog 8, being thus backed up, shifts the reversing member 9 and the table 1, then moves again to the left to carry the grinding wheel 5 onto the rotating workpiece 6. By such return of the table the block 144 is repositioned with the latch lever 149 again behind the shoulder 151. This repositioning means is fully described in the said copending application and as it is not claimed herein, will not be further described. From the foregoing brief description of the table controlling mechanism, which is fully described in the copending application, of which the present application is a division, it will be seen that energization of the electromagnet 97 results in an extended movement of the table 1 to the right, carrying the wheel 5 out of the hole in the workpiece in order that it may be dressed and trued by the dressing device which is lowered into position as already set forth, followed by subsequent resumption of the normal reciprocatory traverse between wheel and workpiece.

Repetition of the amplified dressing stroke is prevented, despite maintenance of the contacts 32 and 34 together, by the following mechanism. On the amplified outward or right hand stroke of the table 1, an outwardly and downwardly projecting bar 163, pivotally secured to the block 146 that moves in unison with the table, strikes an arm 164, Figs. 1 and 10, of movable switch member 88, thereby rocking said member from its normal full line position into the broken line position, where the connector 87 no longer makes contact with the right hand switch bar 85. This terminates the supply of current to the electromagnets 92 and 97, so that, notwithstanding the continued contact between the points 32 and 34, the respective armatures of said magnets are rendered free to move by gravity to their normal inoperative positions. Thus as before described, the finger 107 eventually drops below the slotted portion 116 of rod 103, and the roller 156 drops below the latch member 149, this automatically preventing any repetition of the wheel dressing operation, first, by insuring against a second descent of the dressing point 133, and second, by insuring against a second amplification of the right hand travel of the table. Therefore, with the parts restored to normal position at the end of this single amplified stroke of table 1, the normal working stroke of said table is automatically resumed, to permit the wheel 5 to take the final and finishing cuts on the workpiece.

When the workpiece, in consequence of these final and finishing cuts, has been reduced to the correct finished size, the contact terminals 33 and 35 are brought together, and an electromagnet 166, located behind the electromagnet 97, with its associated lever arm and armature pivoted on the same pivot pin or stud 153, is energized. Referring to Fig. 10, the electric current goes by way of the lead 82 to the central bar 83 of the switch 84, thence by way of the connector 87 to the bar 86, since the movable switch member 88 is now in the dotted line position as aforesaid. The bar 86 is connected by a lead 165 to the electromagnet 166 and the latter is connected by a lead 167 to the contact terminal 35.

Energization of the magnet 166 causes attraction of the armature 168, thus raising an attached lever arm 171. The lever arm 171, as shown in Fig. 1, is just below and in the path of the table dog 8, which is a pivotally mounted dog. Consequently, when the arm 171, as above described, moves upwardly into the path of dog 8, the free end of said dog, on the right hand movement of the table, engages with and rides upon the upwardly inclined surface of arm 71, and this prevents reversal of the direction of travel of the table, since the dog 8 is carried clear of the reversing member 9. The table 1 thus continues its movement to the right into the position shown in Figs. 4 and 5, where it is finally brought to a stop by any suitable means, such as disclosed in the aforesaid Patent No. 1,582,468.

Figure 4:
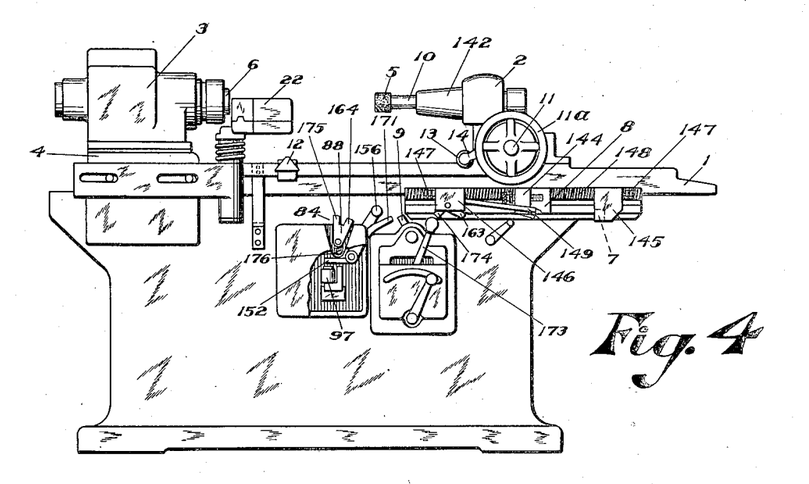
Figs. 4 and 5 are, respectively, a front elevation and a plan view, showing the positions automatically assumed by the parts at the finish of each grinding operation.

The grinding operation on the particular workpiece being thus terminated, it may be removed from the work head 3 and another workpiece inserted therein. To inaugurate the automatic grinding of a fresh workpiece, the table 1 is caused to carry the grinding wheel 5 onto said workpiece by movement to the left, as for example by shifting of the customary hand lever 173. This being done, table 1 moves from the position shown in Fig. 4 to the position shown in Fig. 1, thus rocking the movable switch member 88 from its position shown in Fig. 4 to the position shown in Figs. 1 and 10. Thus the electric connections are restored, by means of which the automatic dressing operation will again take place when the contacts 32 and 34 come together. Referring to Figs. 1 and 4, the shifting of the oscillatory member 88 is brought about as follows. A depending arm 174 carried by the block 146 strikes an arm 175 which forms part of the movable oscillatory member 88. It should be observed that movement of the member 88 to either extreme position is assisted by the usual snap-over device 176. The depending arm 174 strikes only the arm 175 and not the arm 164, for the reason that 174 and 175 are located in one vertical plane, while 163 and 164 are located in a different vertical plane. The electric connections are thus made operative at the initiation of each grinding operation to cause automatic dressing of the grinding wheel 5, as described herein, whenever the contact points 32 and 34 are brought together.

We claim:

1. In a grinding machine, a reciprocating table, a wheel dressing device having its point normally out of the path of the grinding wheel, mechanism adapted, when actuated, to move said dressing point into the path of the grinding wheel, a cam member to actuate said mechanism, and electromagnetic means for connecting said reciprocating table to said cam member.

2. In a grinding machine, a wheel dressing mechanism, a reciprocable cam member for operating said mechanism, a reciprocating table, and means for operatively connecting said cam member to said table, said means consisting of a cooperating finger and slot associated with said cam member, and a rod connected to said table having a shoulder by which the said cam member will be moved by engagement of said shoulder with said finger when said finger is disposed in its path.

3. In a grinding machine, a wheel dressing mechanism, a reciprocable cam member for operating said mechanism, a reciprocating table, and means for operatively connecting said cam member to said table, said means consisting of a cooperating finger and slot, and an electromagnet for actuating the finger.

4. In a grinding machine, operating mechanism for a wheel dressing device comprising a reciprocating member having a pair of shoulders facing in opposite directions, a reciprocable cam member having a pair of slots, a pair of fingers in said slots, one finger being normally pressed by non-positive means into the path of one of said shoulders, whereby movement of said reciprocating member in one direction will carry said cam member in said direction, the other finger being movable by a shaft into the path of the other of said shoulders, to transmit the opposite movement of said reciprocating member to said cam member.

5. In a grinding machine, operating mechanism for a wheel dressing device, comprising a reciprocating member having a shoulder, a reciprocable cam member having a slot therein, a finger in said slot, and means to move said finger to place it in the path of said shoulder.

6. In a grinding machine, operating mechanism for a wheel dressing device, comprising a reciprocating member having a shoulder, a reciprocable cam member having a slot therein, a finger in said slot, and nonpositive means to move said finger into the path of said shoulder, whereby movement of said reciprocating member in one direction is transmitted to said cam member.

7. In a grinding machine, operating mechanism for a wheel dressing device, comprising a reciprocating member having a shoulder, a reciprocable cam member having a slot therein, a finger in said slot, nonpositive means to move said finger into the path of said shoulder, whereby movement of said reciprocating member in one direction is transmitted to said cam member, and a stationary cam plate to force said finger away from said shoulder after movement of said cam member a predetermined amount.

8. In a grinding machine, operating mechanism for a wheel dressing device, comprising a reciprocating member having a pair of shoulders facing in opposite directions, a reciprocable cam member having a pair of slots, a pair of fingers in said slots, one finger being normally pressed by nonpositive means into the path of one of said shoulders, whereby movement of said reciprocating member in one direction will carry said cam member in said direction, the other finger being movable by a shaft into the path of the other of said shoulders to transmit the opposite movement of said reciprocating member to said cam member, and electromagnetic means to operate said shaft.

9. In a grinding machine, operating mechanism for a wheel dressing device, comprising a reciprocating member having a shoulder, a reciprocable cam member having a slot therein, a finger in said slot, and electromagnetic means to move said finger into the path of said shoulder.

10. In a dressing mechanism for grinding machines, a diamond holder, a stand providing a pivotal mounting for said holder, a link, an operating lever connected to said holder by said link, means to actuate said operating lever, a pair of shoulders, one on the diamond holder and one on the stand for arresting the movement of the diamond at its dressing position, and a spring interposed between said operating lever and said link to maintain said shoulders in contact.

11. In a grinding machine, a grinding wheel having a reciprocatory working traverse relative to the work, a grinding wheel dresser, a work calipering device, means set in operation by said work calipering device for disposing said dresser in the line of movement of said wheel, and means, dependent upon the operation of said last mentioned means, for increasing the traverse of said wheel, to include the dresser in its path.

12. In a grinding machine, a grinding wheel, a wheel dressing device movable into and out of dressing position, a support for said wheel which, during the grinding of a workpiece, occupies said dressing position, and means for moving said support out of said position coincident with the movement of said dresser into said position.

13. In a grinding machine, a work calipering member, an indicator lever actuated by said member, and mechanism set in operation by said indicator lever for procuring a grinding wheel dressing operation at an intermediate point in the grinding of each workpiece.

14. In a grinding machine, a work calipering member, an indicator lever actuated by said member, and mechanism set in operation by said indicator lever for procuring, successively, a grinding wheel dressing operation and a cessation of the grinding operation in the grinding of each workpiece.

15. In a grinding machine, a work calipering member, an indicator lever actuated by said member, mechanism set in operation by said indicator lever, for procuring, successively, in the grinding of each workpiece, a grinding wheel dressing operation and a cessation of the grinding operation, and means for adjusting said indicator lever relative to said calipering member.

ROGER N. HEALD.
WALDO J. GUILD.
ALFRED P. BURNS.
GEORGE E. GARNO.